US 8,262,094 B2

(12) United States Patent
Beele (10) Patent No.: US 8,262,094 B2
(45) Date of Patent: Sep. 11, 2012

(54) SYSTEM FOR SEALING A SPACE BETWEEN AN INNER WALL OF A TUBULAR OPENING AND AT LEAST ONE TUBE OR DUCT AT LEAST PARTLY RECEIVED IN THE OPENING

(75) Inventor: Johannes Alfred Beele, Aalten (NL)

(73) Assignee: Beele Engineering B.V., Aalten (NL)

( * ) Notice: Subject to any disclaimer, the term of this patent is extended or adjusted under 35 U.S.C. 154(b) by 616 days.

(21) Appl. No.: 11/988,694

(22) PCT Filed: Jul. 13, 2006

(86) PCT No.: PCT/EP2006/006858
§ 371 (c)(1),
(2), (4) Date: Apr. 16, 2009

(87) PCT Pub. No.: WO2007/028443
PCT Pub. Date: Mar. 15, 2007

(65) Prior Publication Data
US 2009/0315275 A1     Dec. 24, 2009

(30) Foreign Application Priority Data
Jul. 13, 2005  (EP) .................................... 05076609

(51) Int. Cl.
*F16L 5/02*     (2006.01)
*F16J 15/02*    (2006.01)

(52) U.S. Cl. .................. 277/607; 277/630; 277/644

(58) Field of Classification Search .................. 277/574, 277/607–608, 615, 649; 138/89; 285/110, 285/113, 215, 339, 342, 345, 347
See application file for complete search history.

(56) References Cited

U.S. PATENT DOCUMENTS

| 2,032,492 A | * | 3/1936 | Nathan ......................... 277/615 |
| 2,896,974 A | * | 7/1959 | Bush ............................ 277/607 |
| 3,165,324 A | * | 1/1965 | Zopfi ............................ 277/615 |
| 3,580,988 A | * | 5/1971 | Orlowski et al. ......... 174/153 G |

(Continued)

FOREIGN PATENT DOCUMENTS

DE     2 203 370     8/1973

(Continued)

OTHER PUBLICATIONS

International Search Report and Written Opinion from PCT/EP2006/006858.

*Primary Examiner* — Thomas Beach
*Assistant Examiner* — Nicholas L Foster
(74) *Attorney, Agent, or Firm* — Wolf, Greenfield & Sacks, P.C.

(57) ABSTRACT

A system for sealing a space between an inner wall of a tubular opening and at least one tube or duct at least partly received in the opening such that a longitudinal direction of the opening and a longitudinal direction of the at least one tube or duct are substantially parallel to each other. The system comprises at least two segmental longitudinal parts for forming a sealing plug which can be received in the space. The longitudinal parts are each provided with a number of outer ribs and a number of inner ribs, wherein the inner ribs are adjacent each other in the longitudinal direction.

24 Claims, 8 Drawing Sheets

U.S. PATENT DOCUMENTS

| | | | | |
|---|---|---|---|---|
| 3,702,193 | A * | 11/1972 | Flegel et al. | 277/607 |
| 3,893,919 | A * | 7/1975 | Flegel et al. | 210/166 |
| 3,913,928 | A * | 10/1975 | Yamaguchi | 277/604 |
| 4,293,138 | A * | 10/1981 | Swantee | 277/607 |
| 4,426,095 | A * | 1/1984 | Buttner | 277/606 |
| 4,429,886 | A * | 2/1984 | Buttner | 277/606 |
| 4,915,422 | A * | 4/1990 | Chacon et al. | 285/39 |
| 5,020,810 | A * | 6/1991 | Jobe | 277/615 |
| 5,649,712 | A * | 7/1997 | Ekholm | 277/607 |
| 5,954,345 | A | 9/1999 | Svoboda et al. | |
| 6,359,224 | B1 * | 3/2002 | Beele | 174/665 |
| 7,410,174 | B2 * | 8/2008 | Jones et al. | 277/615 |
| 7,802,798 | B2 * | 9/2010 | Beele | 277/607 |
| 7,918,486 | B2 * | 4/2011 | Preisendorfer | 285/216 |

FOREIGN PATENT DOCUMENTS

| | | |
|---|---|---|
| EP | 0 139 337 A2 | 5/1985 |
| EP | 0 795 712 A1 | 9/1997 |
| FR | 2 169 219 | 9/1973 |
| JP | H3-32272 * | 2/1991 |
| NL | 1 023 687 C2 | 12/2004 |
| WO | WO 02/070939 A1 | 9/2002 |
| WO | WO 2004/111513 A1 | 12/2004 |
| WO | WO 2005/003615 A1 | 1/2005 |

* cited by examiner

SYSTEM FOR SEALING A SPACE BETWEEN AN INNER WALL OF A TUBULAR OPENING AND AT LEAST ONE TUBE OR DUCT AT LEAST PARTLY RECEIVED IN THE OPENING

The invention relates to a system for sealing a space between an inner wall of a tubular opening and at least one tube or duct at least partly received in the opening such that a longitudinal direction of the opening and a longitudinal direction of the at least one tube or duct are substantially parallel to each other, wherein the system comprises at least two segmental longitudinal parts for forming a sealing plug which can be received in said space, wherein the longitudinal parts are each of an elastically deformable material and are each provided with an outside which comprises a number of outer ribs spaced apart in a longitudinal direction for realizing, in use, annular contact surfaces which are each closed in itself in a circumferential direction between the sealing plug and the inner wall of the opening, and wherein, further, each of the longitudinal parts is provided with an inside comprising a number of inner ribs for realizing, in use, annular contact surfaces which are each closed in itself in a circumferential direction between the sealing plug and the at least one tube or duct, wherein each of the outer ribs is in transverse direction longer than any of the inner ribs, wherein each of the number of inner ribs is provided with an abutting surface that extends in the longitudinal direction and that in use abuts one of the at least one tube or duct, wherein each inner rib is on either side of the abutting surface further provided with a sloped surface which extends away from the abutting surface, wherein the slope of each sloped surface encloses an angle with a transverse direction of the segmental longitudinal part such that bending of each inner rib is substantially inhibited when the longitudinal parts are inserted in the said space.

The invention also relates to a system for sealing a space between an inner wall of a tubular opening and at least one tube or duct at least partly received in the opening such that a longitudinal direction of the opening and a longitudinal direction of the at least one tube or duct are substantially parallel to each other, wherein the system comprises at least two segmental longitudinal parts for forming a sealing plug which can be received in said space, wherein the longitudinal parts are each of an elastically deformable material and are each provided with an outside which comprises a number of outer ribs spaced apart in a longitudinal direction for realizing, in use, annular contact surfaces which are each closed in itself in a circumferential direction between the sealing plug and the inner wall of the opening, and wherein, further, each of the longitudinal parts is provided with an inside comprising a number of inner ribs for realizing, in use, annular contact surfaces which are each closed in itself in a circumferential direction between the sealing plug and the at least one tube or duct, wherein each of the outer ribs is in transverse direction longer than any of the inner ribs, wherein each of the longitudinal parts comprises a first end that is intended to be first inserted in the opening and a second end that is intended, in use, to remain outside the opening, wherein, further, at least one of the outer ribs substantially has the shape of a sawtooth with a rising surface rising towards the second end.

A tubular opening as referred to hereinabove may comprise a tubular passage in a floor, deck, wall or partition. Another possibility is a tube in which another tube is at least partly received. The longitudinal parts are also referred to as shell parts. Substantially parallel is, in any case, also understood to mean a situation in which the axis of the opening and the axis of the tube or duct received in the opening include an angle of about five degrees.

Such a system is used for, for instance, two tubes connected with each other through which a fluid can flow. One of the tubes may, for instance, form a house surface connection and have a smaller diameter than the tube which forms the main line or is a branch thereof. Such tubes may be used for, for instance, transport of water, gas, oils, liquid chemicals, etc. A space located between the tubes can then be sealed with a system as described hereinabove. It is also possible that cables for, for instance, telephone, electricity and television are fed through such tubes connected with one another. Another possibility is using the system as a sealing between glass fiber cables and protective tubes. Such a system may also be used with walls of buildings, in particular foundation walls and floors but also roofs where, by means of lost plastic tube parts, passages are left open in the poured concrete through which the through ducts, such as tubes for water or gas, or cables can be fed. Of course, a passage may also be provided in a concrete plate with the aid of a boring method. The space between the duct and the inner wall of the lost tube part or the borehole may later be sealed with such a system.

Further, such a system can be used in the construction of new buildings and maintenance of ships and offshore installations. Sections in such constructions are usually formed by placing prefabricated partitions according to a predetermined plan in the dock of the shipyard. Even before the partitions are placed, feed-through tubes can be provided in the partitions, for instance with the aid of a welding method. After the duct is fed through a feed-through tube, the system described in the introduction can be provided for sealing the space between the inner wall of the feed-through tube and the fed-through duct. The sealing plug thus formed then absorbs the possible movement by deformation of the partition during, for instance, a fire or an explosion. The sealing plug further has a vibration-absorbing function so that fatigue symptoms are avoided. The sealing plug is further sound-insulating. In addition, a thermal insulation may be obtained, especially when air is locked in a feed-through tube between two of such plugs. It is further possible that the feed-through tube and the duct, cable or tube fed through it are manufactured from different metal-comprising materials. This is because there will be no contact between the feed-through tube and the duct, cable or tube fed through it so that galvanic corrosion is at least virtually precluded.

The annular space between an inner wall of a tubular opening and at least one tube or duct is hereinbelow often simply referred to as "the space". Inserting the longitudinal parts into the space, is often simply referred to as "inserting".

WO 2004/111513 A1 describes a system for sealing a space between an inner wall of a tubular opening and at least one tube or duct at least partly received in the opening. This system works generally speaking well in the sense that it can sustain a large pressure when inserted, even though it can be inserted with ease, and most often even manually. However, it is regarded even more advantageous if the system were to be applicable, i.e. if the segmental longitudinal parts were to be insertable, in the space between an inner wall of a tubular opening and at least one tube or duct, such that it can sustain an even higher, without compromising on the possibility to insert the system most often manually, and with ease. When reference is made to a pressure the system can sustain, or withstand in use, a pressure is meant as applied to the part of the system, i.e. the part of the sealing plug, that is inserted first.

An object of the invention is to provide a system that is even more advantageous than for instance the system described in WO 2004/111513 A1.

This object of the invention is achieved with a sealing system that is according to the preamble of claim 1 and that is further characterized in that the inner ribs are adjacent each other in the longitudinal direction. Very surprisingly it has been found that such a system can with much more ease be inserted in the said space. It is generally being found that such a system can be completely manually be inserted. Additional tools are hardly, if at all, needed during the insertion of the plug. However, a worker may prefer to use additional tools, instead of his hands.

As the inner ribs are adjacent each other, the inside is stiffer.

A certain part of the inside that is provided with inner ribs is substantially completely provided with inner ribs. It could be said that for that part the longitudinal density of inner ribs is high.

Without wishing to be bound by any theory, it is believed that the higher longitudinal density of inner ribs inhibits bending of the longitudinal parts during insertion. Even slight bending normally introduces extra resistance against insertion of the longitudinal parts. As a result of the reduction of bending, the longitudinal parts of an embodiment according to the invention will be more easily insertable in said space.

The inner ribs are not experienced as contributing much to resistance when the longitudinal parts are inserted. This is believed to be a consequence of the comparatively larger length of the outer ribs in transverse direction and the high longitudinal density of the inner ribs. When inserting a longitudinal part, some resistance is experienced when an outer rib is just entering the space into which the longitudinal part is to be placed. A worker, manually or even with the aid of tools, inserting the longitudinal part, will at that moment have to push with greater effort. When, due to the greater effort, the pushing forces exceed the resisting forces, the longitudinal part will start moving into the space. As the force needed to let the outer rib give way, is much higher than the force needed to let an inner rib give way, there is with respect to the inner rib a "surplus" of pushing force, and hence the inner ribs enter the space without the worker noticing pronounced increase of resistance.

It is also easier for a worker to insert a longitudinal part according to such an embodiment as the worker can increase deliberately the pushing force when the worker sees that a next outer rib is about to enter the space. This makes the insertion a job which can be carried out in a well coordinated fashion in which extra force is applied, when visibly needed, to give a satisfactory result.

In an embodiment of a system according to the invention the slope of the sloped surface is substantially constant from the abutting surface from which it extends away, up to a point where it meets a sloped surface of an adjacent inner rib. The inner rib having sloped surfaces with a constant slope are thus free from a point at which the inner rib may easily bend when the respective longitudinal part is inserted. This also results in an relatively easy and smooth insertion of the longitudinal part, without an unexpected increase in resistance.

In an embodiment of a system according to the invention each slope is substantially the same. This also contributes to the experience that the forces needed to overcome when inserting the longitudinal parts are somewhat predictable and do not suddenly rise. As a consequence thereof the forces needed to overcome when inserting the longitudinal parts are not much affected by the inside of the longitudinal parts. It is further believed that when each slope, and in particular slopes on either side of an abutting surface are substantially the same, the abutting surface is believed substantially to be pressed away into a substantially transverse direction. Forces coinciding with such a translation are substantially directed into the transverse direction and do therefore not as such counteract insertion of the longitudinal parts. The frictional forces which are dependent on the normal forces exerted on the abutting surface remain of course playing a role and need to be overcome when inserting the longitudinal parts.

In an embodiment of a system according to the invention the angle enclosed by the slope and the longitudinal direction is between 60° and 80°. It has turned out that such slope is shallow enough to allow for a smooth insertion of the longitudinal parts. Furthermore, bending of the inner ribs is inhibited. It is preferred that the angle is between 65 and 77°. This results in longitudinal parts which are insertable in an even smoother fashion. It is even more preferred that the angle is between 70° and 75°. The inside of the longitudinal parts virtually slide into the said space when a pushing force is applied. A worker inserting the longitudinal parts experiences relatively little resistance that is clearly attributable to the inner ribs. The pressure which the sealing system can withstand when it has been inserted and has formed a plug in the space, is not compromised by such inner ribs. It will be discussed later that the unnoticed insertion of the inner ribs do not imply that the inner ribs do not contribute to resistance. It was measured that the inner ribs do provide resistance against insertion, even though hardly noticeable.

Preferably a sealing system according to the invention is characterized in that each of the longitudinal parts is free from an inner rib on the inside at a first end that is intended to be first inserted in the opening. This allows for an easy insertion of the first end of the longitudinal parts so that the longitudinal parts can be well aligned for further insertion into the space, inhibiting bending of the longitudinal parts when further insertion occurs.

Preferably the first end is provided with a first inner surface that extends in the longitudinal direction. Hence very little, if at all, resistance is experienced when initial insertion of the first end of longitudinal parts takes place.

In an embodiment of a system according to the invention the outside of each segmental longitudinal part comprises between a set of two neighbouring outer ribs an outer surface that extends in the longitudinal direction. This ensures that on the outer side of the longitudinal parts, space unoccupied by the outer ribs is available for outward movement of a part of the longitudinal part that is situated between the outer ribs. This dispositioning of a part of the longitudinal part, even though very small, is thus facilitated.

Preferably an imaginary transverse plane of a first type intersects both an outer surface and an abutting surface. This has the advantage that the inner rib can more easily be pressed into a transverse direction as the outer surface ensures the availability of space into which a part can be pressed that is itself pressed outwards by the inner rib. Furthermore, with such a position of the abutting surface of the inner rib, relative to the position of the outer surface, it is ensured that immediately after the insertion of the outer rib in the relevant space, an inner rib is entering that space. When the longitudinal part is pushed into the space so firmly that the outer rib gives way, i.e. the outer rib bends to fit in the space, the inner rib, which subsequently enters, is not experienced to enhance the resistance against further insertion of the inner rib. In other words, it will be experienced that the inner rib enters more easily the space.

Preferably an outer surface and an abutting surface which both intersect the same imaginary transverse plane, have a similar length in the longitudinal direction. This ensures that the space available on the outside of the longitudinal parts and the material pressed outwards on the inside from the longitudinal parts, is more or less in balance. During insertion, the longitudinal part can relatively easily be made "thinner" in the transverse direction. This contributes to the possibility of applying a system according to the invention in a space having dimensions that differ from the dimensions for which the system is optimal in terms of insertion and pressure tightness.

An embodiment of a system according to the invention is further characterized in that each of the longitudinal parts comprises at a second end an outer collar that is intended, in use, to be placed against an outer edge of the opening, and wherein, further, at least one of the outer ribs substantially has the shape of a saw tooth with a rising surface rising towards the second end. Longitudinal parts with such outer ribs are easily insertable and provide within the space between the inner wall of the opening and a duct or tube a plug which is able to withstand a very high pressure.

Preferably a part of the rising surface adjoining the top of the saw tooth is provided with a leveling with respect to a part of the rising surface located farther from the top, wherein the leveling includes an angle with the longitudinal direction. It turns out that due to this leveling the tolerances of the diameters of the opening are rather large. As a result thereof, one "size" of a system, i.e. with certain "diameters" of the outer ribs, can be used for a number of differently sized openings. This save costs on moulds for manufacturing the longitudinal parts of the system. Inaccurate measurements of the diameter of the opening is not necessarily a problem as the system can cope with deviations of the diameter of the opening. Furthermore, management of a stock of systems according to the invention on for instance a shipyard will be much easier. One particular size of a system will be suitable for many more applications. This saves overhead costs.

It is possible that an embodiment of a system according to the invention is further characterized in that an imaginary transverse plane of a second type intersects both a position between two adjacent inner ribs and the leveling. This ensures that space is available on an inside of each longitudinal part so that a part of the longitudinal part can be pressed in a direction of that space when each longitudinal part is inserted. A part of the outer rib provided with a leveling will be pressed inwardly into the transverse direction. Space available between two adjacent inner ribs can accommodate for this movement. In practice, this may result in a slight change of the slopes of the inner rib. The angle γ will become slightly larger. In other words, also at the position of the imaginary transverse plane of the second type the longitudinal part can relatively easily be made "thinner" when inserting the longitudinal part. Furthermore, the position of the leveling and the position at which two adjacent inner ribs adjoin, ensures that when the longitudinal part is pushed into the space so firmly that the leveling gives way, i.e. the outer rib bends to fit in the space, another inner rib which subsequently enters the space will follow straightaway. The force, needed to let the outer rib entering the space, is usually enough to also let the following inner rib enter the space. After all, the force needed to let the outer rib enter the space is often still applied when the outer rib enters the space.

WO 2004/111513 A1 describes a system for sealing a space between an inner wall of a tubular opening and at least one tube or duct at least partly received in the opening. This system works generally speaking well in the sense that it can sustain a large pressure when inserted, even though it can be easily inserted, often even manually. However, it is regarded even more advantageous if the system were to be applicable, i.e. if the segmental longitudinal part were to be insertable in the space between an inner wall of a tubular opening and at least one tube or duct, most often manually and with ease, while it can still in use sustain higher pressures than a known system.

An object of the invention is to provide a system that is in use in that sense even more advantageous than the system described in WO 2004/111513 A1.

This object of the invention is achieved with a sealing system that is described in claim 20.

When inserting a longitudinal part, some resistance is experienced when an outer rib is just entering the space into which the longitudinal part is to be placed. A worker manually, or even with the aid of tools, inserting the longitudinal part, will at that moment have to push with greater effort. When due to the greater effort, the pushing forces exceed the resisting forces, the longitudinal part will start moving inwards. The high pushing force is normally still being applied when the outer rib has just completely been inserted in the space, and is large enough to exceed the resisting forces which accompany the insertion of the part of the inner rib that has the largest height in transverse direction. Hence, the insertion of the inner rib, or rather the insertion of the part of the inner rib that has the largest height in transverse direction, is experienced as insertable with ease. The resistance to insertion as originating from that largest height of the inner rib, if occurring at all, will be negligible in comparison to the resistance originating from the top of the outer rib. As the worker can increase deliberately the pushing force when the worker sees that an outer rib is about to enter the space, the insertion can be carried out in a well coordinated fashion in which extra force is applied when visibly needed.

This extra force will be enough to also allow for the insertion of the inner rib, so that the worker only needs to increase the pushing forces when visibly needed. Increasing forces each time an outer rib is about to enter the space, allows for a well coordinated actively, making the job of inserting an efficient job.

An embodiment of such a system according to the invention is characterized in that the sawtooth has a top that is situated along the longitudinal direction such that when that outer rib is not inserted in said space, the top is situated somewhat closer towards the first end than the part with the largest transverse height of that one inner rib. Such an embodiment has the advantage that during insertion it is likely that both the top and the largest height of the inner rib enter the space together, as the top will then bend slightly towards the second end.

The closer the top of the outer rib and the largest height of the inner rib are along the longitudinal direction during insertion, the less likely it is that the largest height of the inner rib is separately giving rise to an increase in the pushing force as needed during progression of the insertion.

One inner rib of an embodiment of such a system according to the invention may be provided with an abutting surface that extends in the longitudinal direction and that in use abuts one of the at least one tub or duct, wherein the outside of each segmental longitudinal part comprises between a set of two neighbouring outer ribs an outer surface that substantially extends in the longitudinal direction, wherein an imaginary transverse place of a first type intersects an outer surface on the outside and that abutting surface.

This embodiment has the advantage that the inner rib can more easily be outwardly pressed into a transverse direction as the outer surface ensures the availability of space into which a part of the longitudinal part can be pressed when that part is itself pressed away by the suppressed inner rib. It will in general more easily be possible for the longitudinal part to become "thinner" in its transverse direction. This contributes to the possibility of applying a system according to the invention in a space having dimensions that differ from the dimensions for which the system is optimal in terms of insertion and pressure tightness.

In an embodiment of such a system according to the invention the sawtooth may be provided with a falling surface, the transverse plane of the first type intersecting the outer surface at a position at which the outer surface adjoins the falling surface of the outer rib. Furthermore, the inner rib may be provided with a sloped surface extending towards the part with the largest transverse height, wherein the transverse plane of the first type intersects the abutting surface at a position at which the sloped surface adjoins the abutting surface.

The inventor has found that the outer rib and the inner rib on such an embodiment have an optimal position relative to each other for large flexibility of the system when applied in a situation where dimensions of the tubular opening and/or the tube or duct are different from those for which the system is ideally intended. Insertability and the pressure the systems can sustain may be different in such a situation, but the system can still be used satisfactorily.

Although it is indicated that the outer ribs are predominantly determining the increases of the pushing forces needed and experienced when inserting the system, it may by no means be concluded that the inner ribs do not play a role in the resistance build up when inserting the system. In the following description this will be discussed in more detail.

The invention will now be elucidated with reference to one or more examples depicted in a drawing, in which:

FIG. 5b shows in more detail part B of FIG. 5a; and

FIG. 5c shows in more detail part C of FIG. 5a.

Like parts are in the drawing designated by like reference symbols. Where a length of a dimension is shown in the drawing, this length is expressed in millimeters and may apply to a particular embodiment. Often other lengths are possible.

A system according to the invention comprises at least two segmental longitudinal parts 1. An example of a longitudinal part 1 of such a system is schematically in cross-section in FIG. 1. An application of such a system is shown in a first partial cross-sectional view in FIG. 2a and in a second partial cross-sectional view in FIG. 2b. An application of such a system is schematically shown in a perspective view in FIG. 3.

Each of the longitudinal parts 1 is of an elastically deformable material. Further, each of the longitudinal parts 1 is provided with an outside 2 which comprises a number of outer ribs 3 spaced apart in a longitudinal direction for realizing, in use, annular contact surfaces 4 which are closed in itself in a circumferential direction (see FIG. 2a) between a sealing plug 5 formed with the aid of the longitudinal parts 1 and an inner wall 6 of a tubular opening 7. The term "spaced apart" encompasses a situation in which a substantial part of the ribs is unconnected. It thus means that the space is available between parts of the ribs. However, "spaced apart" does not exclude a situation in which the ribs are adjacent each other. Each of the longitudinal parts 1 is further provided with an inside 29 comprising a number of inner ribs 30 for realizing, in use, angular contact surfaces 31 (see FIG. 2b) which are each closed in itself in a circumferential direction between the sealing plug 5 and a tube 17. Tube 17, which may also be a duct, is received in the opening such that a longitudinal direction of the opening 7 and a longitudinal direction of the tube 17, are substantially parallel to each other.

Each of the outer ribs 3 is in a transverse direction T longer than any of the inner ribs 30.

Each inner rib 30 has preferably the shape of a trapezium. Each of the inner ribs 30 is provided with an abutting surface 32. That extends in the longitudinal direction L and that in use abuts the tube 17. Each inner rib 30 is on either side of the abutting surface 32 provided with a sloped surface 52 which extends away from the abutting surface 32. The slope of each sloped surface encloses an angle γ (see FIG. 1a), with a transverse direction T of the segmental longitudinal part 1 such that bending of each inner rib 30 is substantially inhibited when the longitudinal part 1 is inserted. The insertion will be described later.

The slope of the sloped surface 52 is substantially constant from the abutting surface 32 from which it extends up to a point where it meets a sloped surface of an adjacent inner rib 30. Each slope of the sloped surfaces 52 of one of the inner ribs 30 is substantially the same. The sloped surfaces 52 of the two adjacent inner ribs 30 form together a V-shaped groove. In the example shown all slopes of all inner ribs are substantially the same. The angle γ, is between 60° and 80°, preferably between 65° and 77° and even more preferably between 70° and 75°.

These inner ribs can relatively easily be pressed into a transverse direction, even when the system is applied in a situation in which the tube in the opening is much thicker than the thickness for which that system is intended. The contact surfaces will in such a case be much longer than in a case in which a thinner tube is used. It may even be the case that the annular contact surfaces become adjacent thinner, i.e. the inside of a longitudinal part between inner ribs contributes to the contact surface. In such situations the tube may touch the first inner surface 53 and the second inner surface 56. The pressure the formed plug can in such a situation sustain is of course much higher as compared to a situation with separated annular contact surfaces.

Each of the longitudinal parts 1 is free from an inner rib 30 on the inside 29 at a first end 37 that is intended to be first inserted. Inside 29 is at the first end 37 provided with a first inner surface 53 that extends in the longitudinal direction L. The first inner surface 53 and a meeting 54 of two inner ribs 30 coincide with one straight virtual line VL1.

Each of the longitudinal parts 1 is free from an inner rib 30 on the inside 29 at a second end 55 that is intended in use to remain outside the opening into which the system is inserted. The inside 29 is at a second end 55 provided with a second inner surface 56 that extend in the longitudinal direction L. The second inner surface 55 and a meeting 54 of two inner ribs 30 coincide with one straight virtual line VL2. An advantage of the lack of an inner rib close to the second end 55 is that the interaction between the longitudinal parts, the inner wall of the opening and the tube, result in local deformation that is not extended towards a part of the plug that remains in use outside the opening. The part of the plug that remains in use outside the opening comprises a collar 9 and a flange 55 which will be discussed later, these parts will not be deformed if the forces and their response are balanced within the space formed between the opening and the tube.

A system according to the invention comprises two or more of such segmental longitudinal parts 1 for sealing a space 16 between the inner wall 6 of the tubular opening 7 and a tube 17 or duct at least partly received in the opening 7, whose axis is substantially parallel to the axis of the opening 7. With the system, a sealing plug 5 can be formed and be placed in the space 16. The sealing plug 5 may also tightly enclose a tube 17 or duct (see FIGS. 2*a*, 2*b*, and 3).

The outside 2 of each segmental longitudinal part 1 comprises between the set of two neighbouring outer ribs 3 an outer surface 2*a* that extends in the longitudinal direction L.

Figure 5A:
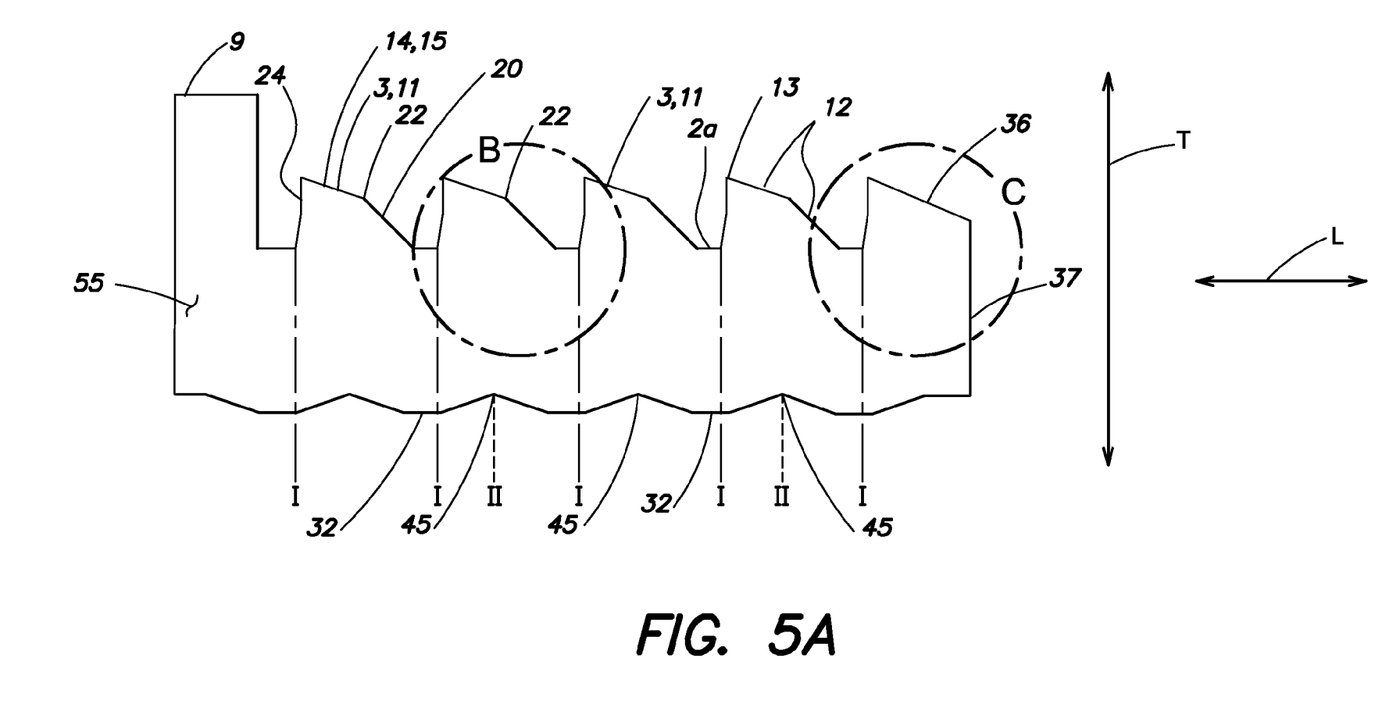
FIG. 5a shows a part of the cross section according to FIG. 1 with preferred dimensions for a particular embodiment.

It is shown in FIG. 5*a* that an imaginary transverse plane of a first type I intersects an outer surface 2*a* on the outside 2 and an abutting surface 32 on the inside 29. The outer surface 2*a* and an abutting surface 32 which both intersect the same imaginary transverse plane I, have a similar length in the longitudinal direction L. Over the entire length in the longitudinal direction of the outer surface 2*a* and/or the abutting surface 32 which both intersect the same imaginary transverse plane I, that outer surface 2*a* and that abutting surface 32 are situated next to each other.

Figure 2A:
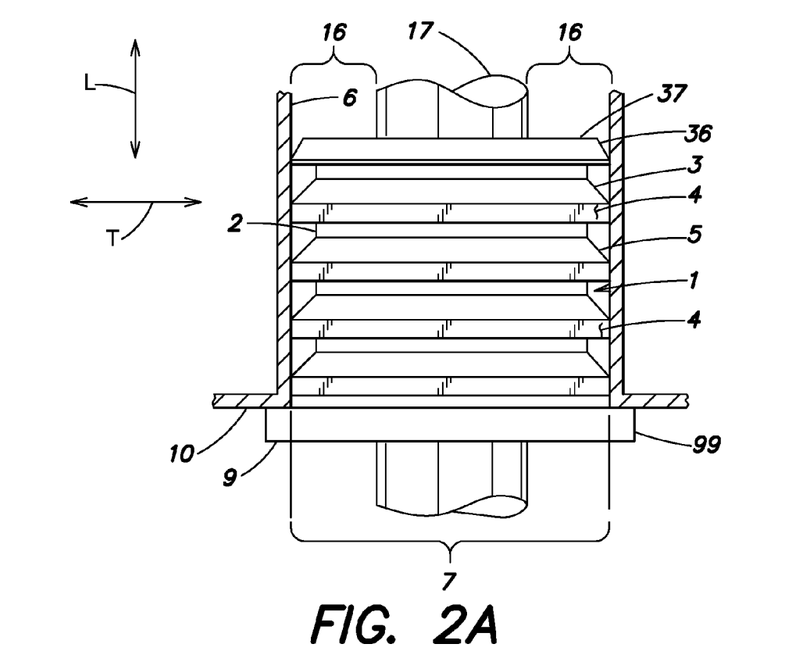
FIG. 2a shows in a schematic cross section of an embodiment of a system according to the invention a first partial cross section.
Figure 2B:
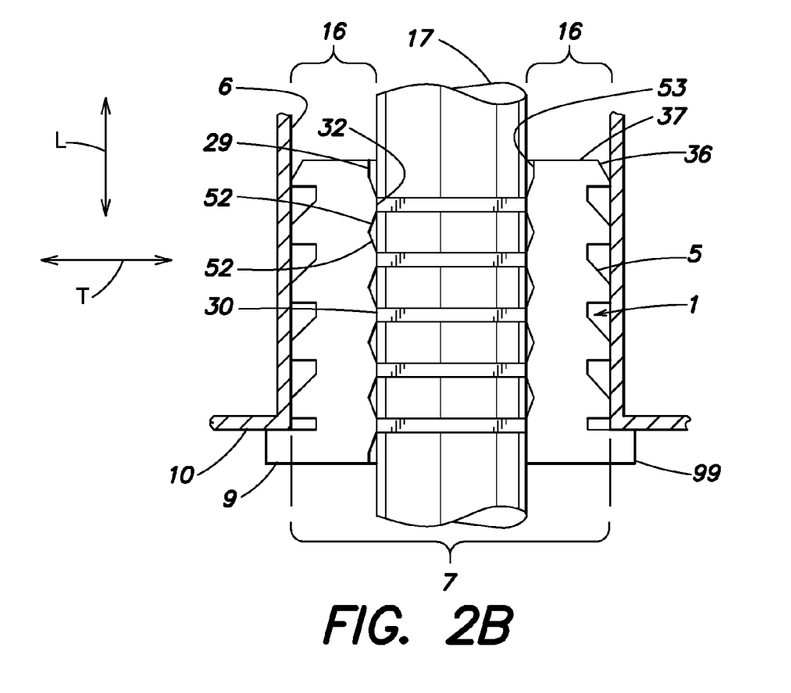
FIG. 2b shows a second partial cross section, of a longitudinal part according to FIG. 1a as received in a space between an inner wall of a tubular opening and one tube or duct received in the opening.

At the second end 55 the longitudinal part 1 is provided with an outer collar 9 intended to be placed against an outer edge 10 of the opening 7 in use (See FIGS. 2*a* and 2*b*). The collar 9 is part of a flange 99 which is such that forces can be exerted into the flange for inserting the longitudinal parts 1. The flange 99 is preferably designed such that it can be placed against the outer edge 10 of the opening 7. The appearance of the flange can be designed in whatever way a designer would like to. An example is shown in FIG. 4*a*. After insertion, the flange will remain visible in almost every use. The flange has a thickness as a dimension in longitudinal direction that allows for stability. Preferably the thickness is more than 5 mm, and is larger when the plug itself is larger.

The outer ribs 3 each substantially have the shape of a sawtooth 11 with a rising surface 12 rising towards the second end 55. It is of course possible that only one outer rib has the shape of a sawtooth, or that some but not all outer ribs have the shape of a sawtooth. In this example, all outer ribs have the shape of a sawtooth. A part 14 of the rising surface 12 adjoining the top 13 of the sawtooth 11, is, with respect to a part 20 of the rising surface 12 located farther from the top 13, provided with a leveling 15 which includes an angle with the longitudinal direction L. Each rising surface 12 is provided with a pressing surface 15 adjoining a top 13 of the sawtooth 11. The pressing surface 15 includes an angle $\alpha$ with the longitudinal direction L, which angle $\alpha$ is smaller than an angle $\beta$ included by a part 21 of the rising surface 12 located farther from the top 13 and the longitudinal direction L. The angle $\alpha$ is in any case larger than zero.

A meeting 22 of the leveling 15 and the part 21 of the rising surface 12 located farther from the top 13 forms an outwardly directed bend 23 located in the rising surface 12. Although, in this example, the bend is formed by a meeting of straight surfaces, it is also possible that the bend is formed by a meeting of surfaces which merge more gradually with regard to the orientation of the surfaces.

A falling surface 24 of the sawtooth 11 is provided with a part 25 located relatively far from the top 13, which is designed so as to be inclined towards the second end 55 with respect to a part 26 of the falling surface 24 adjoining the top 13. The part 26 of the falling surface 24 adjoining the top 13 of the sawtooth 11 includes an angle $\theta$ with the longitudinal direction L which is larger than the angle $\omega$ included by the part 25 of the falling surface 24 located farther from the top 13 and the longitudinal direction L.

A meeting 27 of the part 26 of the falling surface 24 adjoining the top 13 of the sawtooth 11 and the part 25 of the falling surface 24 located farther from the top forms an inwardly directed bend 28 located in the falling surface 24. The bend 23 located in the rising surface 12 is located farther from the outside 2 than the bend 28 located in the falling surface 24. The note made hereinabove for bend 23 also holds true for bend 28 and a more gradual merge from the part of the falling surface adjoining the top into the part of the falling surface located farther from the top is therefore also understood to mean a bend in this specification. It is further noted that it is also possible to provide a sawtooth with a bend 28 in the falling surface without the rising surface of the sawtooth comprising a leveling. For each feature of the falling surface, it generally holds true that the feature may also be designed with a sawtooth lacking one or some of the features of the rising surface described in this specification.

FIGS. 2*a* and 2*b* show perhaps in more detail how the longitudinal parts 1 cooperate with the inner wall 6 of the opening 7 and the tube 17 at least partly received in the opening. FIG. 2*a* shows the inner wall of the tubular opening 7 in cross section, while the sealing plug 5 formed with the aid of the longitudinal parts 1 is shown in a view such as it would be seen when one half of the tubular opening 7 would have been removed. In general, outside the tubular opening 7, the longitudinal parts are tightly applied around the tube 17 and then, by a movement in the longitudinal direction L, slide into the space 16 between the inner wall 6 of the tubular opening 7 and the tube 17. At the first end, 37, each longitudinal part 1 comprises on the outside a run-in rib 36. The run-in rib 36 extends up to a first outer circumferential level that is in transverse direction closer than a second outer circumferential level up to which each outer rib 3 extends (see for example FIG. 5*b* and FIG. 5*c*). The run-in rib 36 will then be the first to contact the inner wall 6 of the tubular opening 7. Upon pressing in the longitudinal direction L, more inner ribs 3 will contact the inner wall 6 of the tubular opening 7. Particularly the top 13 and at least a part of the surface of the leveling 15 will contact the inner wall 6. In order to overcome frictional forces occurring during this insertion it is most often necessary to provide the longitudinal parts and/or the inner wall of the tubular opening and/or tube 17 with a lubricant such as for instance Vaseline or soft soap. Particularly when the inner wall is manufactured from concrete, this provides a good solution for reducing the high frictional forces. The longitudinal parts should be manually insertable. However, in some cases, it may be necessary to move the sealing plug 5 farther in the direction of the longitudinal direction L into the tubular opening 7 with for instance, a hammer. The sealing plug 5 can no longer be moved farther in the longitudinal direction L when the outer collar 9 is placed against the outer edge 10 of the opening 7. This is because the dimensions of the outer collar hinder a further movement in the longitudinal direction L. At least a part of the surface of each leveling 15 will, in that case, be pressed against the inner wall 6 of the tubular opening 7.

FIG. 2b also shows the inner wall 6 of the tubular opening 7 in cross section. The sealing plug 5 received in the tubular opening 7 is also shown in a same cross-sectional plane. Only of the tube 17 at least partly received in the tubular opening, a view is shown in which the annular contact surfaces 31 formed with the aid of the inner ribs 30 of the sealing plug 5 assembled from the longitudinal parts 1 are shown as well. It will be clear that any attempt to move the sealing plug 5 received in the tubular opening 7 in a direction opposite to the longitudinal direction L will be counteracted by the friction at the annular contact surfaces 31 between the inner ribs 30 and the tube 17 and the friction occurring at the contact surfaces 4 closed upon themselves between at least a part of each leveling 15 and an inner wall 6 of a tubular opening 7. The frictional forces to overcome will be greatest at the location of the top 13. Due to the leveling 15, upon a compression of the sawtooth in the direction towards the second end 55, the surface area of the contact surface 4 will increase which entails that a still greater force is needed to press the plug out of the tubular opening 7 in the direction towards the second end 55. It has been found that, in some cases, a sealing plug 5 assembled from the system according to the invention holds out up to at least a pressure of 7 bar exerted on the first end 37.

Figure 3:
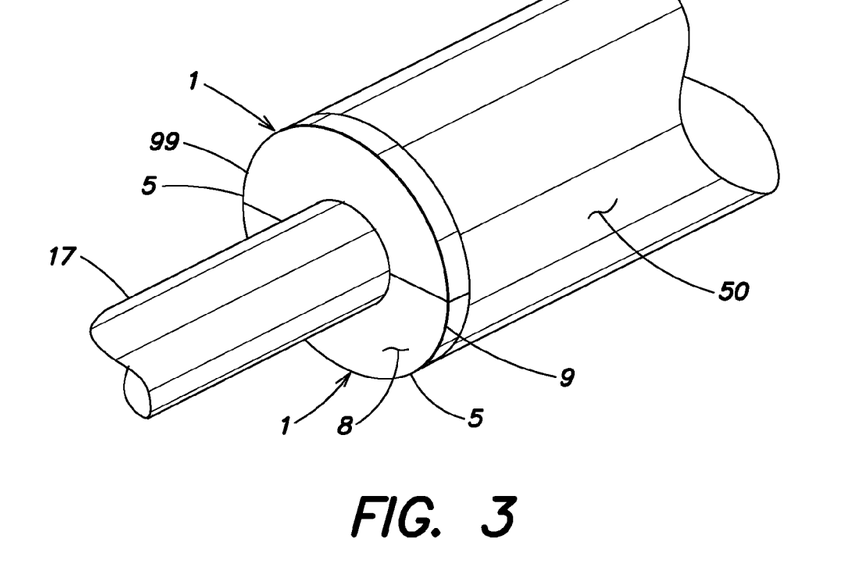
FIG. 3 shows a perspective view of an application of a system according to the invention.

FIG. 3 shows a perspective view of an application of the system according to the invention. Here, a sealing plug 5 assembled from the longitudinal parts 1 has been received in a space between an inner wall of a tubular opening and a tube 17 at least partly received in the opening. The axis of the tube 17 is substantially parallel to the axis of the opening. The opening is not visible because an outer collar located at the first front end of the sealing plug 5 abuts the outer edge of the opening. Of the tubular opening, only an outer wall 50 is shown. In this case, the tubular opening is a part of a tube of which the outer wall 50 is shown. However, it is also possible that the tubular opening is formed in a wall.

Figure 4:
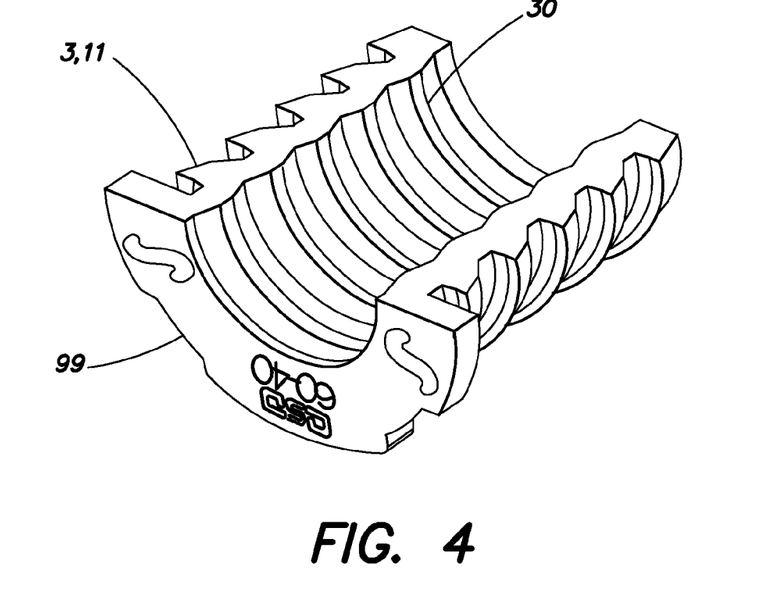
FIG. 4 shows a perspective view of a longitudinal part of a second embodiment of a system according to the invention.
Figure 4A:
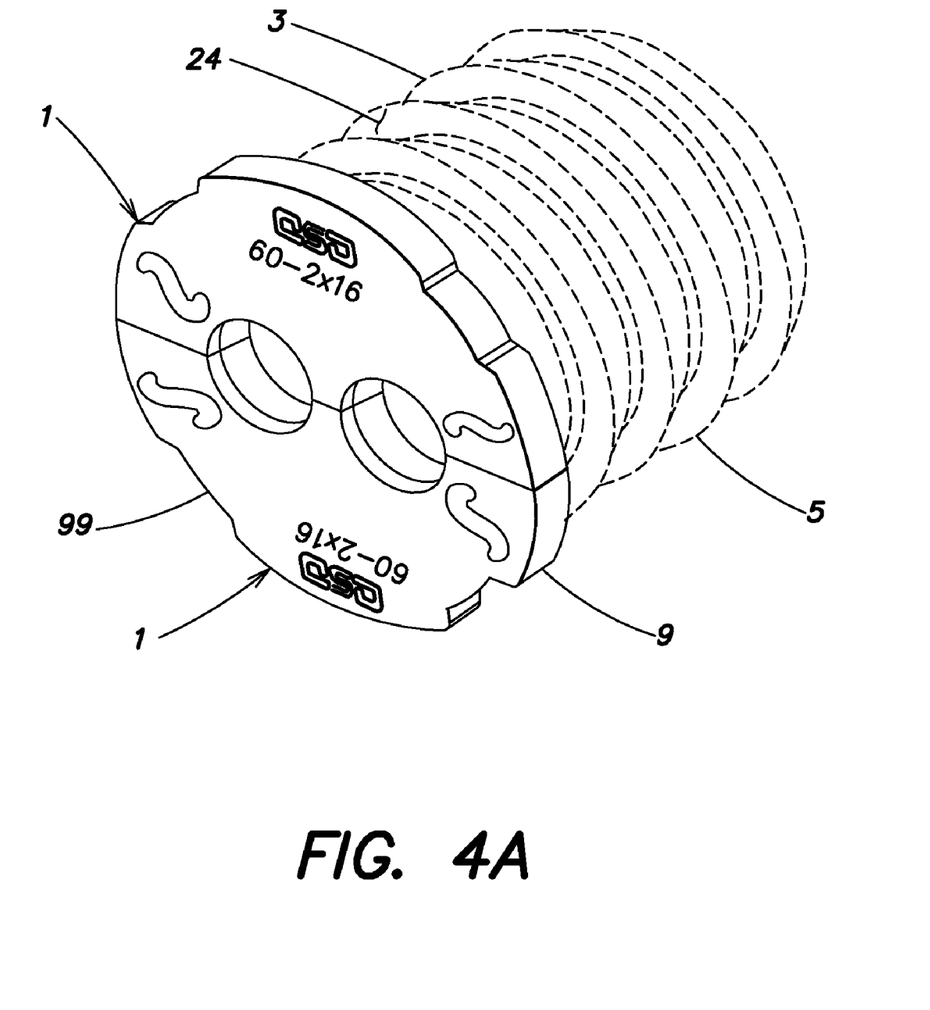
FIG. 4a shows a perspective view of the second embodiment of a complete system according to the invention.
Figure 4B:
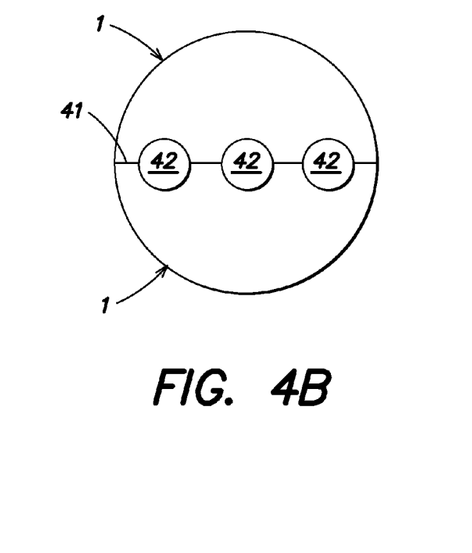
FIGS. 4b-4e show schematically each a view in longitudinal direction L of a third, fourth, fifth and sixth embodiment of a system according to the invention, respectively.
Figure 4C:
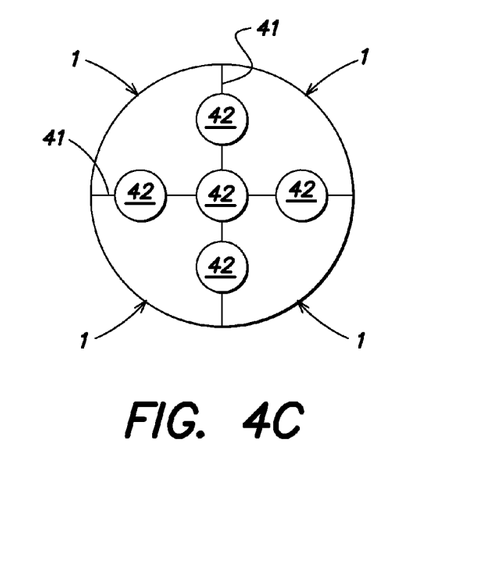
Figure 4D:
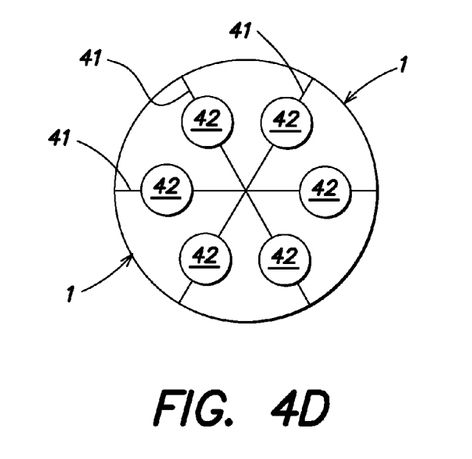
Figure 4E:
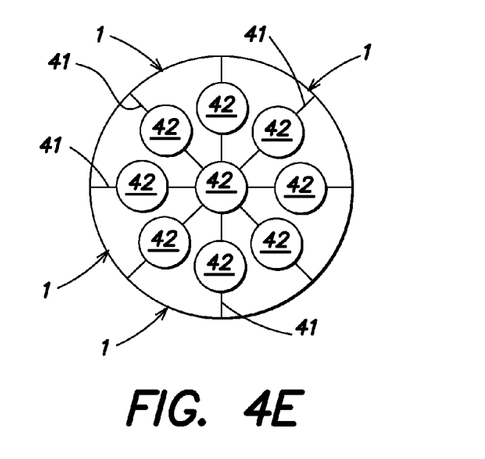

As indicated above, FIG. 4 shows a perspective view of a longitudinal part of an embodiment of a system according to the invention.

It is possible that the system according to the invention comprises two, three, four, five, six or even more longitudinal parts. Of a system comprising two longitudinal parts, FIG. 4a shows a view of the second end 55 of the longitudinal parts 1 assembled into a sealing plug. FIGS. 4b-4e show schematically each a system according to the invention with three, five, six and nine longitudinal parts, respectively. Each of the longitudinal parts 1 comprises at least two inner surfaces 41, while each of these inner surfaces 41 is provided with a recess 42 extending in the longitudinal direction L for being able to at least partly enclose one of the tubes 17 received in the opening 7.

The longitudinal parts 1 of the system according to the invention are preferably substantially identical to one another.

Figure 1:
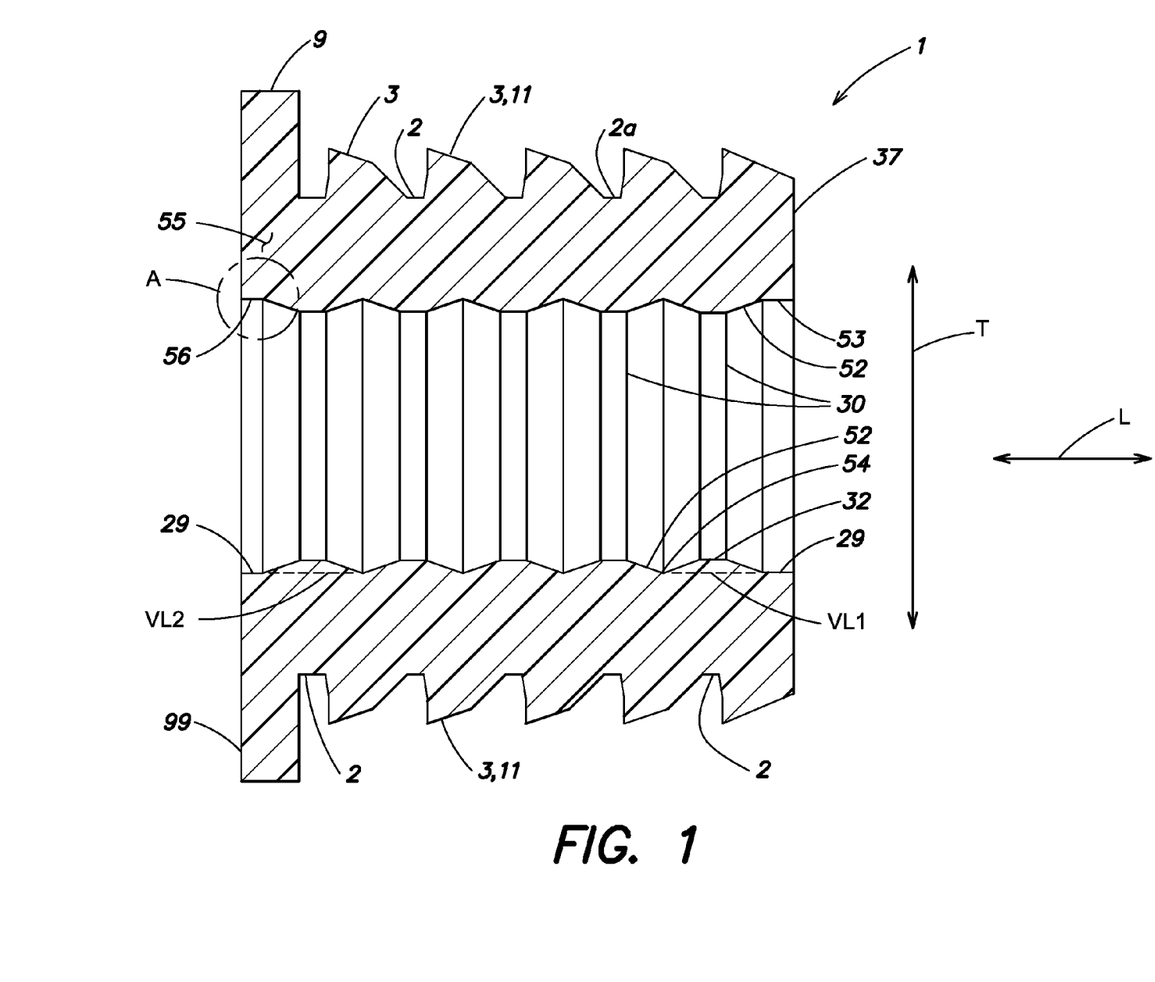
FIG. 1 shows a cross section of a longitudinal part of a system according to a first embodiment according to the invention.
Figure 1A:
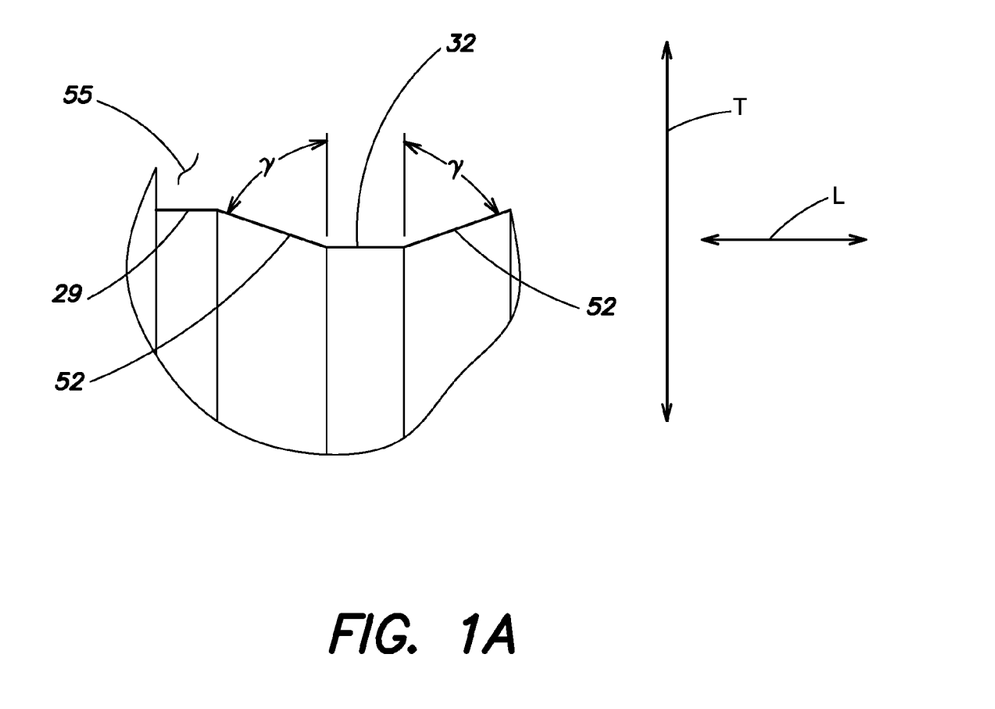
FIG. 1a shows in more detail part A of FIG. 1.
Figure 5B:
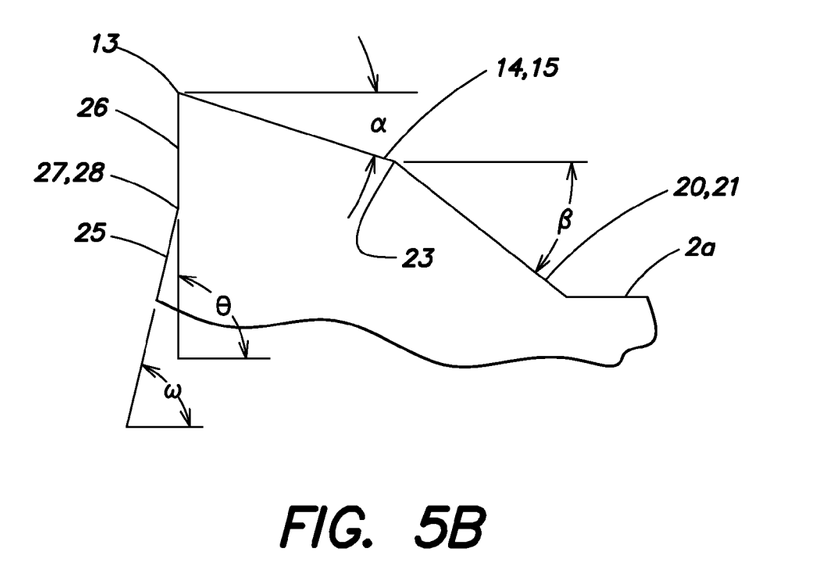
Figure 5C:
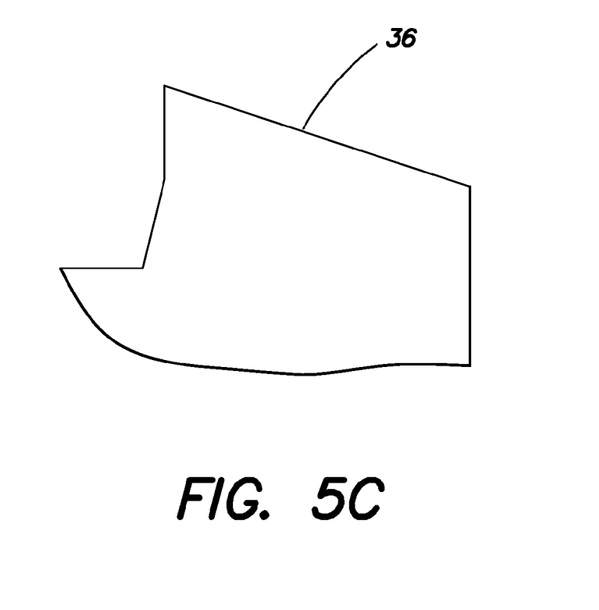

FIG. 5a shows a cross section of a part that is similar to a part shown in FIG. 1. It applies in particular that the part shown in FIG. 5a has preferred dimensions for a system forming a plug suitable for an opening having a diameter of 60 mm and a tube having a diameter of 28 mm. FIG. 5b and FIG. 5c show the parts B and C of FIG. 5a in more detail.

It will be clear that the preferred dimensions of the longitudinal parts depend on the dimensions of the opening and the dimensions and number of tubes received in the opening. It is for instance also possible that for larger systems more inner and outer ribs are applied.

In FIG. 5a is further visible that an imaginary transverse plane of a second type II intersects both a position 45 between two adjacent inner ribs 30 and the leveling 15.

In FIG. 5a is further shown that one of the inner ribs 30 has a part with a largest transverse height with such a position along the longitudinal direction L that when that one outer rib 30 has during insertion of longitudinal part just completely been inserted in space 16, the part with the largest transverse height of that one inner rib has at least partly been inserted in space 16 or is just about to be inserted in space 16. The part with the largest transverse height may be the abutting surface 32. However this positional relationship between the largest transverse height of an inner rib and an outer rib may also apply to an inner rib having a shape that differs from the trapezium shape. It is also possible that this positional relationship along the longitudinal direction between the outer rib and the largest transverse height of an inner rib is applied in an embodiment not having the inner ribs adjacent each other.

For a visualization of the interaction between the inner wall 6, the tube 17 and the plug as inserted in the space between the inner wall 6 and tube 17, reference is made to the schematic diagrams shown in FIGS. 2a and 2b.

It is to be noted that the falling surfaces 24 are in these schematic FIGS. 2a and 2b shown to be strictly parallel to the transverse direction. However, it is likely that the falling surface 24 is in reality somewhat parallel to the rising surface 12 and that consequently an outer annular contact surface formed initially between the outer rib and the inner wall 6 during insertion, will in longitudinal direction overlap with an immediately following inner annular contact surface between an inner rib and the tube 17.

For such an embodiment it further applies that the sawtooth may have a top 13 that is situated along the longitudinal direction such that when that one outer rib 3 is not inserted in space 16, top 13 is situated somewhat closer towards the first end 37 than the part with the largest transverse height of that one inner rib 30. When the longitudinal parts are inserted, the top 13 will be forced to bend somewhat towards the second end 55. The top 13 and largest transverse height of the inner rib may then be at a similar distance from the second or first end. In other words, during insertion the top 13, may intersect with an imaginary transverse plane that intersects the largest transverse height of an inner rib. This leads to the experience that during insertion only the outer ribs are "felt" to give resistance against insertion. A worker inserting such longitudinal parts can increase a pushing force in correspondence with the insertion of an outer rib, making the job very manageable.

It may further apply that that one inner rib 30 may be provided with an abutting surface 32 that extends in the longitudinal direction L and that in use abuts tube 17. The outside of each segmental longitudinal part comprises between a set of two neighbouring outer ribs 3 in an outer surface 2a that substantially extends in the longitudinal direction L the imaginary transverse plane I of the first type intersects the outer surface 2a on the outside 2 and that abutting surface 32. The transverse plane of the first type I may intersect the outer surface 2a at a position at which the outer surface 2a adjoins the falling surface of the outer rib 3.

It may further apply that the inner rib 30 is provided with a sloped surface 52 extending towards the part with the largest transverse height, wherein the transverse plane of the first type I intersects the abutting surface 32 at a position at which the sloped surface 52 adjoins the abutting surface 32. It turns out that these positional relationships lead to optimal use of a surplus of the pushing force, provided by a worker when inserting an outer rib in the space.

Above, it is explained that the inner rib is during insertion of the longitudinal part not experienced as contributing to the resistance against insertion of the longitudinal part. Experiments have shown that indeed the forces needed to insert the longitudinal parts sharply increase when an outer rib is being inserted. Such an increase was not observed when an inner rib is inserted. However, when the longitudinal parts are first inserted in an opening in which as yet no tube is received, and secondly a tube is pressed into the plug as formed in the opening by the longitudinal parts, the forces needed to insert the tube, increase sharply each time the tube is passing an inner rib. In other words, the inner ribs do provide resistance, although not experienced. When the system is applied in an opening having a diameter smaller than the diameter for which the system is ideally intended, this effect is even more pronounced. When the system is applied in a opening having a diameter larger than the diameter for which the system is ideally intended, this effect is likely to be somewhat less pronounced, i.e. the resistance of the inner ribs may be experienced to a minor extent. When the system is applied for sealing an opening with therein a tube having a diameter smaller than the diameter for which the system is ideally intended, the effect of not experiencing the inner tube is more pronounced. When the system is applied for sealing an opening with therein a tube having a diameter larger than the diameter for which the system is ideally intended, the effect is less pronounced, i.e. the resistance of the inner ribs may be experienced to a minor extent.

Another advantage of a system according to the invention became apparent during these experiments. The plug formed by the longitudinal parts does not move even though a tube is inserted into the plug. It turns out that this advantage applies to axial movements of the tube, but also to off-axis movements. The system is applicable in situations where the tube is moving within the plug, without compromising on the pressure tightness or insertability of plug or tube.

Longitudinal parts 1 will usually be manufactured from at least somewhat compressible material, such as for instance rubber, preferably rubber with a shore A hardness in a hardness window ranging from 65 up to 75°, preferably 68-72° and even more preferably of 70°. An advantage of rubber is that its volume can hardly change, if at all. The invention can advantageously use this property of rubber. In use the longitudinal parts of an embodiment of a system according to the invention force, in use, parts to occupy space so as to enhance the pressure tightness and the insertability. The rubber is preferably of a fire-resistant quality. The rubber may be designed such that it expands upon exposure to elevated temperatures. It is also possible to use a silicone rubber. An electrically conductive rubber is also among the possibilities. The system may have a gastight and watertight design due to manufacture from a suitable material, but may also have a fireproof, gastight and watertight design. During the manufacture of longitudinal parts 1, use will usually be made of a mold suitable for this purpose. Such a production process is known per se. Both injection molding and compression molding may be used.

For an example of a possible use of the system reference is made to FIG. 7 of WO 2004/111513 A1 and the description therein accompanying FIG. 7.

The invention is by no means limited to the exemplary embodiments shown. Many variants are possible. The outer collar may have any desired shape. The outer collar may, for instance, be designed such that the sealing plug is provided with a rectangular outer collar, for instance square with somewhat rounded angles. The thickness of the outer collar, the distance over which the outer collar extends in the longitudinal direction L, is preferably such that the shape of the sealing plug near the outer collar is preserved in use and the sealing plug cannot be pressed into the tubular opening.

As indicated above, outer ribs may also be adjacent each other. This is still understood to be spaced apart. Although not explicitly described, it is indicated that the shape and/or positioning of the inner ribs with respect to each other may also be applied to the outer ribs.

Although, preferably, the sealing plug 5 has a substantially cylindrical design, a deviation from this shape is also among the possibilities. Thus, the system can be designed such that the system is suitable for tubular openings which are quadrangular and/or rectangular. Embodiments suitable for multiangular tubular openings are not precluded either. Even embodiments for other non-circular, such as for instance oval-shaped tube openings, are among the possibilities. The same holds true for the suitability with regard to cables, ducts or tubes to be fed through the tubular opening. The system can be designed such that, in use, tubes and the like with a cross section deviating from a circular shape can be enclosed by the sealing plug. If desired, a skilled person will be able to adjust the dimensions and dimensioning to the circumstances within the scope of the invention.

The invention claimed is:

1. A system for sealing a space between an inner wall of a tubular opening and at least one tube or duct at least partly received in the opening such that a longitudinal direction of the opening and a longitudinal direction of the at least one tube or duct are substantially parallel to each other, the system comprising:
    at least two segmental longitudinal parts for forming a sealing plug which can be received in said space, each of the longitudinal parts being of an elastically deformable material and provided with an outside which comprises a number of outer ribs spaced apart in a longitudinal direction for realizing, in use, annular contact surfaces which are each closed in itself in a circumferential direction between the sealing plug and the inner wall of the opening, each of the longitudinal parts is being provided with an inside comprising a number of inner ribs for realizing, in use, annular contact surfaces which are each closed in itself in a circumferential direction between the sealing plug and the at least one tube or duct, each of the outer ribs being longer in transverse direction than any of the inner ribs, each of the inner ribs being provided with an abutting surface that extends in the longitudinal direction and that in use abuts one of the at least one tube or duct, each inner rib on either side of the abutting surface further being provided with a sloped surface which extends away from the abutting surface, the slope of each sloped surface disposed at an angle with respect to a direction transverse to the longitudinal direction of the segmental longitudinal part such that bending of each inner rib is substantially inhibited when the longitudinal parts are inserted in the said space, the inner ribs being directly adjacent each other in the longitudinal direction such that the slope of the sloped surface extends away from the abutting surface up to a point where it meets a sloped surface of an adjacent inner rib, wherein a transverse plane intersects both a position between two directly adjacent inner ribs and a middle region of one of the outer ribs.

2. The system according to claim 1, wherein the slope of the sloped surface is substantially constant.

3. The system according to claim 2, wherein each slope of the sloped surfaces of one of the inner ribs is substantially the same.

4. The system according to claim 1, wherein two sloped surfaces of two adjacent inner ribs form together a V-shaped groove.

5. The system according to claim 3, wherein all slopes are substantially the same.

6. The system according to claim 1, wherein the angle is between at least one of 60 and 80 degrees, 65 and 77 degrees and 70 and 75 degrees.

7. The system according claim 1, wherein each of the longitudinal parts is free from an inner rib on the inside at a first end that is intended to be first inserted in the opening.

8. The system according to claim 7, wherein the inside is at the first end provided with a first inner surface that extends in the longitudinal direction.

9. The system according to claim 8, wherein the first inner surface and a meeting of two inner ribs coincide with one straight virtual line.

10. The system according to claim 1, wherein each of the longitudinal parts is free from an inner rib on the inside at a second end that is intended in use to remain outside the opening.

11. The system according to claim 10, wherein the inside is at the second end provided with a second inner surface that extends in the longitudinal direction.

12. The system according to claim 11, wherein the second inner surface and a meeting of two inner ribs coincide with one straight virtual line.

13. The system according to claim 1, wherein the outside of each segmental longitudinal part comprises an outer surface between a set of two neighboring outer ribs, the outer surface extending in the longitudinal direction.

14. The system according to claim 13, wherein a transverse plane of a first type intersects an outer surface on the outside and an abutting surface on the inside.

15. The system according to claim 14, wherein an outer surface and an abutting surface which both intersect the same transverse plane have a similar length in the longitudinal direction.

16. The system according to claim 14, wherein over the entire length in the longitudinal direction of the outer surface and/or the abutting surface which both intersect the same transverse plane, the outer surface and the abutting surface are situated next to each other.

17. The system according to claim 1, wherein each of the longitudinal parts comprises an outer collar at a second end thereof, the outer collar intended in use to be placed against an outer edge of the opening, and wherein at least one of the outer ribs substantially has the shape of a sawtooth with a rising surface rising towards the second end.

18. The system according to claim 17, wherein a part of the rising surface adjoining the top of the sawtooth is provided with a leveling with respect to a part of the rising surface located farther from the top, wherein the leveling includes an angle with the longitudinal direction.

19. The system according to claim 18, wherein a transverse plane of a second type intersects both a position between two adjacent inner ribs and the leveling.

20. A sealing system comprising:
an inner wall of a tubular opening and at least one tube or duct at least partly received in the opening such that a longitudinal direction of the opening and a longitudinal direction of the at least one tube or duct are substantially parallel to each other;
at least two segmental longitudinal parts for forming a sealing plug which can be received in said space, each of the longitudinal parts being of an elastically deformable material and provided with an outside which comprises a number of outer ribs spaced apart in a longitudinal direction for realizing, in use, contact surfaces which are each closed in itself in a circumferential direction between the sealing plug and the inner wall of the opening, each of the longitudinal parts being provided with an inside comprising a number of inner ribs for realizing, in use, annular contact surfaces which are each closed in itself in a circumferential direction between the sealing plug and the at least one tube or duct, each of the outer ribs being longer in transverse direction than any of the inner ribs, each of the longitudinal parts comprising a first end that is intended to be first inserted in the opening and a second end that is intended, in use, to remain outside the opening, a first outer rib closest to the first end, a first inner rib closest to the first end, at least one of the outer ribs being substantially a sawtooth-shaped outer rib with a rising surface rising towards the second end, each of the inner ribs having a part with a largest transverse height at such a position along the longitudinal direction such that, during insertion of the longitudinal parts, when the first outer rib has just been completely inserted in said space, the part with the largest transverse height of the first inner rib has been partially inserted in said space or is just about to be inserted in said space.

21. The system according to claim 20, wherein the at least one substantially sawtooth-shaped outer rib has a top that is situated along the longitudinal direction such that when that one outer rib is not inserted in said space, the top is situated somewhat closer towards the first end than the part with the largest transverse height of that one inner rib.

22. The system according to claim 20, wherein that one inner rib is provided with an abutting surface that extends in the longitudinal direction and that in use abuts one of the at least one tube or duct, wherein the outside of each segmental longitudinal part comprises an outer surface between a set of two neighboring outer ribs, the outer surface substantially extending in the longitudinal direction, wherein a transverse plane of a first type intersects an outer surface on the outside and that abutting surface.

23. The system according to claim 22, wherein the sawtooth is provided with a falling surface, the transverse plane of the first type intersecting the outer surface at a position at which the outer surface adjoins the falling surface of the outer rib.

24. The system according to claim 22, wherein the inner rib is provided with a sloped surface extending towards the part with the largest transverse height, wherein the transverse plane of the first type intersects the abutting surface at a position at which the sloped surface adjoins the abutting surface.

\* \* \* \* \*